US009754339B2

(12) United States Patent
Buser et al.

(10) Patent No.: US 9,754,339 B2
(45) Date of Patent: Sep. 5, 2017

(54) METHOD AND SYSTEM FOR HIGH VOLUME DOCUMENT PROCESSING

(71) Applicant: American Express Travel Related Services Company, Inc., New York, NY (US)

(72) Inventors: Ed Buser, Sunrise, FL (US); John Cary, Saint Johns, FL (US); Sean Nestler, Weston, FL (US); Nilesh Sonwane, Pune (IN); Harish Sundaram, Weston, FL (US); Nilesh Wani, Ambernath (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 319 days.

(21) Appl. No.: 13/929,454

(22) Filed: Jun. 27, 2013

(65) Prior Publication Data

US 2014/0195294 A1  Jul. 10, 2014

Related U.S. Application Data

(60) Provisional application No. 61/750,141, filed on Jan. 8, 2013.

(51) Int. Cl.
*G06Q 10/10* (2012.01)
*G06Q 50/32* (2012.01)
*G06Q 10/06* (2012.01)

(52) U.S. Cl.
CPC ............. *G06Q 50/32* (2013.01); *G06Q 10/06* (2013.01)

(58) Field of Classification Search
CPC ............................. G06Q 10/00; G06Q 30/02
USPC ................................................ 705/7.11–7.42
See application file for complete search history.

(56) References Cited

U.S. PATENT DOCUMENTS

| 8,682,479 | B1 * | 3/2014 | Clupper et al. | 700/224 |
| 2005/0080660 | A1 * | 4/2005 | deSilva et al. | 705/9 |
| 2005/0119786 | A1 * | 6/2005 | Kadaba | 700/224 |
| 2006/0108266 | A1 * | 5/2006 | Bowers et al. | 209/584 |
| 2008/0082205 | A1 * | 4/2008 | Park et al. | 700/223 |
| 2009/0319324 | A1 * | 12/2009 | Lee et al. | 705/8 |

* cited by examiner

*Primary Examiner* — David Rines
(74) *Attorney, Agent, or Firm* — Snell & Wilmer L.L.P.

(57) ABSTRACT

A system and method configured for a dynamic sorting scheme is disclosed. The method may comprise receiving a mailing data corresponding to multiple mailing pieces, analyzing the mailing data based on an intended geographic destinations of the multiple mailing pieces and determining multiple geographic location groupings, filtering the mailing data into the multiple geographic location groupings, selecting a number of product type groupings based on product information of the multiple mailing pieces, electronically sorting the multiple mailing pieces based on mail qualifier criteria, determining a processing schedule of available sorting equipment and personnel for processing the multiple mailing pieces, simulating the processing of the multiple mailing pieces using the processing schedule, adjusting the processing schedule based on a result of the simulating the processing of the multiple mailing pieces, and sorting the multiple mailing pieces into multiple processing jobs.

19 Claims, 5 Drawing Sheets

METHOD AND SYSTEM FOR HIGH VOLUME DOCUMENT PROCESSING

PRIORITY CLAIM

This application is a non-provisional of, and claims the benefit of, U.S. Provisional Application No. 61/750,141, entitled, "METHOD AND SYSTEM FOR HIGH VOLUME DOCUMENT PROCESSING," which was filed on Jan. 8, 2013, which is hereby incorporated by reference for any purpose in its entirety.

FIELD OF THE DISCLOSURE

The present disclosure relates to the field of document processing, and in particular, relates to high volume document processing.

BACKGROUND ART

Numerous businesses and other organizations mail large quantities of mail (e.g., bills, statements, packages, advertisements, and computer-generated letters) and "pre-sort" the mail in mail sorters. Each piece of sorting equipment may have specific restrictions on which processing jobs are acceptable. The restrictions may be related to the number of mailing pieces to be sorted, such as a minimum or maximum number of pieces. The sorting equipment may also be restricted on the size of any pieces to be processed. Some sorting equipment may be capable to processing multiple sizes if set accordingly, or a sorting equipment machine may only be designed for processing a particular document size. An overall sorting process is faster and more efficient if the sorting equipment is used efficiently.

SUMMARY

The present disclosure provides a method, computer-readable medium and system for dynamically and electronically sorting multiple mailing pieces based on several criteria. The electronic sorting facilitates a more efficient and faster sorting process, and one that can take the availability of sorting equipment and personnel into account on a dynamic basis. The disclosure provides an exemplary method of a dynamic sorting scheme. The method comprises receiving mailing data corresponding to multiple mailing pieces, wherein the mailing data comprises information identifying attributes of the multiple mailing pieces for distribution, analyzing the mailing data based on an intended geographic destinations of the multiple mailing pieces and determining a plurality of geographic location groupings, filtering the mailing data into the plurality of geographic location groupings, selecting a number of product type groupings based on product information of the multiple mailing pieces, electronically sorting the multiple mailing pieces based on mail qualifier criteria, determining a processing schedule of available sorting equipment and personnel for processing the multiple mailing pieces, simulating the processing of the multiple mailing pieces using the processing schedule, adjusting the processing schedule based on a result of the simulating the processing of the multiple mailing pieces, and sorting the multiple mailing pieces into a plurality of processing jobs, where each processing job of the plurality of processing jobs comprises a subset of the multiple mailing pieces. The dynamic sorting scheme method may also include directing the plurality of processing jobs to the available sorting equipment. Furthermore, the dynamic sorting scheme method may include determining the minimum job size threshold and maximum job size threshold for the available sorting equipment. Moreover, the scheme may include dynamically adjusting the product type groupings and mail qualifier criteria during a mail processing run.

In various embodiments, the attributes of the multiple mailing pieces may include a destination address, the number of pages in each mailing piece, the mailing class (e.g., first class mail), or product size. The product size can include box sizes or envelope sizes. With respect to the intended geographic location of the mailing, the plurality of geographic location groupings can be divided into countries, territories, states, providences, zip code, region, or the like. Additionally, the mail qualifier criteria can include at least one of physical mailing characteristics, box size, and envelope size, wherein the envelope size may vary based on number of pages or type of insert in the mailing piece.

The present disclosure further includes computer program product of a computer-readable medium usable with a programmable computer and having computer-readable code embodied therein for dynamic sorting scheme of multiple mailing pieces.

DETAILED DESCRIPTION

Various embodiments presented herein relate to processing of mailing data for high volume printing. The mailing data correspond to multiple mailing pieces for distribution. The mailing data comprises information identifying attributes of the mailing pieces, such as destination address, number of pages, mailing class, product size, and/or the like. A post-processing rule engine dynamically sorts the mailing data to form one or more print jobs conforming to a minimum and maximum job size threshold. The post-processing rule engine may sort the mailing data based on geographic locations (e.g., countries, territories, states, providences, zip codes, and/or regions); a product type (e.g., mailers, inserts, and physical products); and a mail qualifier (e.g., physical mailing characteristics, box size, envelope size, number of pages or type of insert in the mailing piece). By dynamically and electronically sorting the mailing data, the post-processing rule engine may optimize the jobs for different printing, kitting, inserting, and mail piece sorting workstations, and may eliminate or reduce small size jobs. The post-processing rule engine may be configured to process any mail pieces for shipping in large volumes (e.g., credit card statements, promotional offer mailers, card upgrade notification mailers, card renewal mailers, physical products, and/or the like).

The detailed description of exemplary embodiments herein makes reference to the accompanying drawings and figures, which show the exemplary embodiments by way of illustration only. While these exemplary embodiments are described in sufficient detail to enable those skilled in the art to practice the present disclosure, it should be understood that other embodiments may be realized and that logical and mechanical changes may be made without departing from the spirit and scope of the present disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

The present disclosure is described herein with reference to system architecture, block diagrams and flowchart illustrations of methods, and computer program products according to various aspects of the present disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The present disclosure is now described in terms of an exemplary system in which the present disclosure, in various embodiments, would be implemented. This is for convenience only and is not intended to limit the application of the present disclosure. It will be apparent to one skilled in the relevant art(s) how to implement the present disclosure in alternative embodiments.

Figure 1:
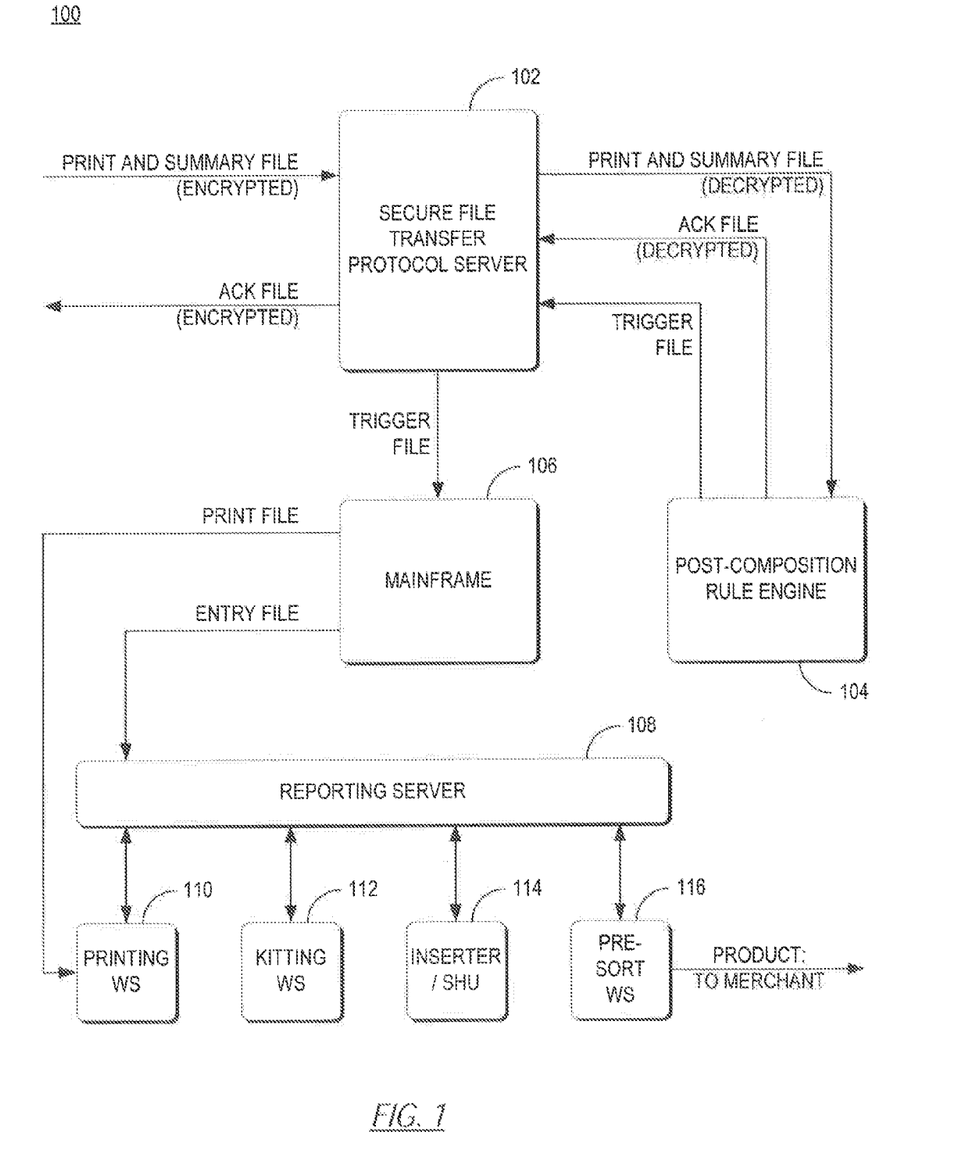
FIG. 1 illustrates a high volume document processing system, in accordance with various embodiments.

FIG. 1 illustrates a high volume document processing system 100 in accordance with various embodiments. The system 100 includes a secure file transfer protocol (SFTP) server 102, an advanced post-composition rule engine 104, and a mainframe 106. System 100 can also comprise a reporting server 108 in communication with a printing workstation 110, a kitting workstation 112, an inserter/sheet handling unit (SHU) 114, and a pre-sort workstation 116.

The SFTP server 102 may provide file access, file transfer, and file management functionalities to the high volume document processing system 100. In various embodiments, the SFTP server 102 is configured to encrypt and decrypt files for the high volume document processing system 100. In various embodiments, the SFTP server 102 may provide pretty good privacy (PGP) encryption and decryption of files. The SFTP server 102 may receive an encrypted print and summary file from an external source. For example, the SFTP server 102 may receive encrypted print and summary files from various regional offices of the enterprise, or from third party customers that require high volume document processing. The SFTP server 102 may decrypt the encrypted print and summary files and forward them to the post-composition rule engine 104. The SFTP server 102 may receive an acknowledgment (ACK) file from the post-composition rule engine 104. The SFTP server 102 may then encrypt the ACK file and transmit the encrypted ACK file to the external source that sent the encrypted print and summary file. The SFTP server 102 may also forward any processed data generated by the post-composition rule engine 104, to the mainframe 106 for dispatch to workstations and the reporting server 108. The SFTP server 102 may run known embodiments based on UNIX, Windows® and so forth. In some embodiments the SFTP server 102 may run the OpenSSH server. Although the embodiment of FIG. 1 implements a secure file transfer protocol server, it should be appreciated that a non-encryption based file transfer protocol (FTP) server may also be employed, where data encryption and secure communication sessions may not be required.

The post-composition rule engine 104 receives the decrypted print and summary file from the SFTP server 102 for processing. The post-composition rule engine 104 may transmit an ACK file to confirm receipt of the decrypted print and summary file, to the SFTP server 102. The post-composition rule engine 104 may identify mailing data from the print and summary file. The post-composition engine 104 processes the mailing data based on a plurality of rules. In various embodiments, the post-composition engine 104 may sort the mailing data based on rules such as geographic location, product type, and mail qualifiers, to define one or more processing jobs. The processing jobs may include print jobs, kitting jobs, insertion and sheet handling jobs, pre-sorting jobs, and so forth. In various embodiments, the post-composition engine 104 generates a trigger file containing the defined processing jobs. The trigger file may contain the processing jobs which include details of workstations that will process each individual record in the mailing data, the processing schedule of the records in the mailing data, and so forth. The post-composition engine 104 transmits the trigger file to the SFTP server 102, which in turn forwards the trigger file to the mainframe 106.

The mainframe 106 may be any system designed to handle large volume data processing, high I/O operations, and provide a high computational throughput. The mainframe 106 may be capable of handling very large data files containing numerous data records. The mainframe 106 may accept the trigger file generated by the post-composition rule engine 104 as input. The mainframe 106 may generate a print file, based on the trigger file. The print file contains the processing jobs defined by the post-composition rule engine 104. In various embodiments, the processing jobs may include information such as, for example, identifier of the workstation to be used to print the mailing piece, identifier of the workstation to be used to kit the mailing piece, identifier of the workstation to be used to insert the mailing piece into appropriate packaging, identifier of the workstation to be used to pre-sort the mailing pieces, information required by each of workstations to process the mailing piece, process scheduling information, and so forth. The mainframe 106 may transmit the print file to the workstations 110, 112, 114, 116.

In various embodiments, the mainframe 106 may also generate an entry file based on the trigger file. The entry file includes information associated with each of the mailing pieces in the processing jobs. The entry file may include information such as: recipient of the mailing piece, particulars of the mailing piece such as type of communication, and pertinent information being communicated. The pertinent information may include, for example, a payment amount for a credit card statement, date of generating the mailing piece, and so forth. The mainframe 106 may transmit the entry file to the reporting server 108.

The reporting server 108 can be configured to store a log of all mailing pieces being processed. The reporting server 108 may receive the entry file from the mainframe 106 and store it in a persistent data storage unit. The reporting server 108 may log the entry files for purposes of auditing and reporting to, for example, a federal entity, a corporate headquarters, and the like. In various embodiments, the reporting server 108 may also receive processing job summaries from one or more workstations used to implement the processing jobs. The processing job summaries may include a status identifier for each of the mailing pieces. The status identifier may include, for example, a status such as "completed successfully", "completed with errors", "not completed", "date and time of job processing", and so forth. In various embodiments, the reporting server 108 may verify the entry file using the processing job summaries to further improve accuracy of reporting and logging. In one implementation, the reporting server 108 may be implemented on the mainframe 106.

The printing workstation 110 can be configured to print the mailing pieces. In various embodiments, the printing workstation 110 may include one or more printers, such as, inkjet printers, laser printers, offset printers, and so forth. The printers may be configured to handle different paper sizes, different paper weights, different print quality settings, and so forth. The printing workstation 110 receives the print file and executes the processing jobs marked as print jobs. The printing workstation 110 thus generates the printed mailing sheets. The printing workstation 110 may also generate printed stickers, or printed envelops carrying the recipient information such as the name and address of the recipient. The printing workstation 110 may also report the status of each printed sheet, whether printed successfully, to the reporting server 108.

The kitting workstation 112 can be configured to gather multiple printed sheets and other inserts that are part of a print job. In various embodiments, the kitting workstation 112 receives the printed sheets from the printing workstation 110. Furthermore, the kitting workstation 112 can retrieve inserts, other documents, and the like from various areas that are to be part of the mailings. The kitting workstation 112 consolidates the received printed sheets and other documents into central location, based on information within the print job. The kitting workstation 112 may kit the printed sheets based on the processing jobs marked as kitting jobs in the print job. The kitting workstation 112 gathers all the materials in aggregate so that the correct materials can be provided to the inserter/SHU 114 for selecting and inserting.

The kitting workstation 112 may report errors or successful kitting to the reporting server 108. In various embodiments, the kitting workstation 112 transfers the mailing kits to the inserter/SHU 114, and transmits a status update to the reporting server 108.

The inserter/SHU 114 can be configured to consolidate multiple printed sheets related to the same mailing piece. In various embodiments, the inserter/SHU 114 receives the printed sheets from the kitting workstation 112. The inserter/SHU 114 consolidates the received printed sheets into individual mailings, based on information within the print job. The inserter/SHU 114 may also utilize identification markings on the printed sheets for consolidating the correct printed sheets into the mailings. For example, a credit card statement may include 3 printed sheets, and may be accompanied by 2 sheets of promotional material. The print job may indicate that sheet numbers 400-403 (pertaining to the credit card statement), and sheet numbers 3010-3012 (pertaining to the promotional material), should be grouped together as a single mailing. The inserter/SHU 114 may consolidate the appropriate sheets into a mailing based on the sheet count. The inserter/SHU 114 may also verify the accurate inserting by reading identification markings such as barcodes, page numbers, and so forth on the printed sheets. The inserter/SHU 114 may report errors or successful inserting to the reporting server 108. In various embodiments, the inserter/SHU 114 transfers the mailings to the pre-sorting workstation 116, and transmits a status update to the reporting server 108.

Furthermore, in various embodiments, the inserter/SHU 114 can be configured to fold the printed sheets of the mailings as defined, and package the mailings into envelopes, boxes, and so forth. In various embodiments, the print job may include processing jobs marked as SHU jobs. The SHU jobs include information such as, indicating the particular sheets of the mailing for folding, the number of folds, the type of fold, whether no folds are desired, whether sheets need to be folded individually or as a stack, and so forth.

The sheets of the mailing kit, as processed by the sheet handling unit, are transferred to the inserter for inserting into the appropriate mailing package. The print job may include processing jobs marked as inserter jobs. The inserter jobs may identify the mailing kits to be packaged, and the associated package for the mailing kit. The inserter/SHU 114 may be capable of packaging the mailing kits into a plurality of different envelope sizes, different envelope types such as with a transparent window or a plain paper envelop, different box sizes, and so forth. The inserter/SHU 114 may either use packages and envelops as produced in bulk, or may use packages and envelops printed by the printing workstation 110. The output of the inserter/SHU 114 is a complete mailing piece.

The pre-sorting workstation 116 receives the complete mailing pieces from the inserter/SHU 114. The pre-sorting workstation 116 may be capable of automated mail sorting to segregate mailing pieces into batches of different zip codes, for example. The pre-sorting workstation 116 may read the recipient information from the envelop or package, and automatically sort the mailing pieces. The pre-sorted mailing pieces are forwarded to the merchants, postal department, or courier service, or dispatched to the recipients directly.

Figure 2:
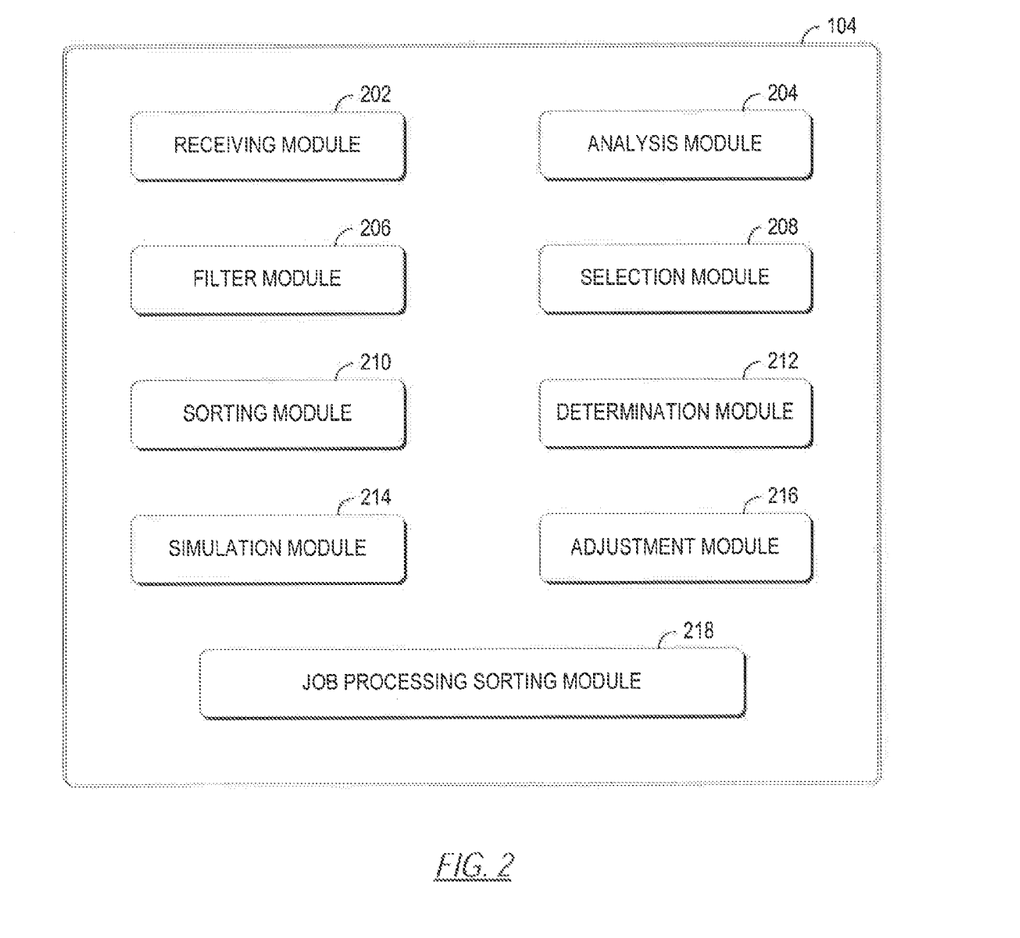
FIG. 2 illustrates a block diagram of a post composition rule engine, in accordance with various embodiments.

FIG. 2 illustrates an exemplary embodiment of a post-composition rule engine 104. In various embodiments, the post-composition rule engine 104 includes a receiving module 202, an analysis module 204, a filter module 206, a selection module 208, a sorting module 210, a determination module 212, a simulation module 214, an adjustment module 216, and a job processing module 218.

The receiving module 202 can be configured to receive mailing data corresponding to multiple mailing pieces for distribution. In various embodiments, the mailing data includes information identifying attributes of the mailing pieces, such as, but not limited to, destination address, number of pages, mailing class, product information such as product size and product type, and so forth. The mailing data may also include information to be mailed, such as, credit card statement information including, without limitation, statement date, card number, card member name, total amount due, payment due date, a listing of transactions, and so forth. The mailing data may be sorted using various criteria based on the information identifying attributes of the mail pieces.

The analysis module 204 can be configured to analyze the mailing data based on intended geographic destinations of the multiple mailing pieces and determining a plurality of geographic location groupings. The analysis module 204 may analyze the destination address associated with the mailing piece from the mailing data. Examples of geographic location groupings include, without limitation, countries, territories, states, providences, zip codes, regions, counties, and so forth. The mailing pieces for the defined geographic location groupings may be shipped by the enterprise to customers directly, to regional offices of the enterprise, or to affiliated shipping service providers of the enterprise.

The filter module 206 filters the mailing data into the plurality of geographic location groupings. The mailing pieces that are not included in the geographic location groupings determined by the analysis module 204 can be filtered into a worldwide non-presort grouping. The enterprise may send such mailing pieces in the worldwide non-presort grouping to the national postal services, such as the United States Postal Service (USPS) for mailing or shipping. Further, some mailing pieces may be addressed to non-deliverable geographic areas. Such mailing pieces may be removed from the processing. Such mailing pieces may be processed by a separate process, processed manually, or held until the geographic area is deliverable (e.g., due to a natural disaster, etc.).

In various embodiments, the selection module 208 may select a number of product type groupings based on product information of the multiple mailing pieces. The selection module 208 may read the product information corresponding to the mailing pieces from the mailing data received by the receiving module 202. Product type groupings include, for example, mailers, inserts, and physical products. Mailing pieces of different product types may be printed at different print settings—such as quality, size, weight of the paper, and the like. Alternatively, mailing pieces of different product types may be handled by different printers equipped or set-up for the particular product type.

The sorting module 210 electronically filters and sorts the mailing pieces based on mail qualifier criteria. Mail qualifier criteria include physical mailing characteristics, box size, envelope size, whether shipping hazardous or non-hazardous material, and so forth. The envelope size may be derived from the number of pages or type of insert in the mailing piece. Some mail qualifier criteria may be included in the mailing data, while some mail qualifier criteria such as envelope size, may be derived from other information in the mailing data.

The determination module 212 can be configured to determine a processing schedule of available sorting equipment and personnel for processing the multiple mailing pieces. In various embodiments, the processing schedule may list the order of processing the mailing pieces, volume of mailing pieces to be processed by each of the sorting equipment and personnel, the estimated time of completion of each sorting, and so forth. The determination module 212 may use the factors of equipment and personnel status information to facilitate determining the processing schedule.

The equipment and personnel status information may be stored at the post-composition rule engine 104 or at another location accessible by the post-composition rule engine 104. The equipment status information is the status information of various sorting equipment such as the printing workstations 110, the kitting workstations 112, the inserter or sheet handling units 114, the pre-sort workstations 116 as described with reference to FIG. 1. The equipment status information includes, for example, if the equipment is busy or available, estimated time to completion of the current job of the equipment, and so forth. Similarly, the personnel status information includes, for example, if the personnel are busy or available, estimated time to completion of the current job of the personnel, and so forth.

The simulation module 214 simulates the processing of the multiple mailing pieces using the processing schedule. The simulation module 214 may simulate the processing using the available equipment and personnel. The simulation module 214 may utilize equipment and personnel capability information such as the throughput capability, estimated time for processing one or a preset number of mailing pieces, and so forth. The equipment and personnel capability information may be stored at the post-composition rule engine 104 or at another location accessible by the post-composition rule engine 104. The simulation module 214 may plug the equipment and personnel capability information in the processing schedule, and generate a simulation result. The simulation result may indicate the idle time of each of the available equipment and personnel, the load on each of the available equipment and personnel, total estimated time of completion of the processing schedule, bottlenecks in the processing schedule and so forth.

In various embodiments, the adjustment module 216 may adjust the processing schedule based on the simulating the processing of the multiple mailing pieces. The adjustment module 216 may reassign mailing pieces to different available equipment and personnel, and/or change volume or number of mailing pieces handled by each of the available equipment and personnel to utilize the available equipment and personnel more efficiently, and/or reduce the overall time of completion of the processing schedule.

The job processing sorting module 218 can be configured to electronically divide the multiple mailing pieces into a plurality of processing jobs. Each processing job includes a subset of the multiple mailing pieces. In various embodiments, the job processing sorting module 218 utilizes the output of the filter module 206, the selection module 208, the sorting module 210, and the determination module 212 to sort the mailing pieces into a plurality of processing jobs. In other words, the job processing sorting module 218 may define processing jobs sorted according to geographic location grouping, product type grouping, and mail qualifier criteria, and efficiently meet the processing schedule. For example, a processing job may include only a single geographic location grouping, a single product type grouping, and a single mail qualifier criterion. However, a processing job may include multiple mail qualifier criteria, or multiple product type groupings. The number of mailing pieces in a processing job may be governed by a minimum job size threshold and a maximum job size threshold. For example, the minimum job size threshold may dictate that the processing job must have at least 30 mailing pieces, and the maximum job size threshold may dictate that a processing job may have no more than 6000 mailing pieces. Processing jobs that include mailing pieces less than the minimum job size threshold may be combined with other similar processing jobs to result in a processing job size within the job size thresholds. Similar processing jobs may include jobs having at least one of a geographic location grouping, a product type grouping, or a mail qualifier criterion in common. Processing jobs that exceed the maximum job size threshold may be split into multiple processing jobs to result in processing job sizes within the job size thresholds.

In various embodiments, the post-composition rule engine 104 may also include a dynamic adjustment module (not shown). The dynamic adjustment module may be configured to dynamically adjust the product type groupings and mail qualifier criteria for each mail processing run or group of mail processing runs. In accordance with various embodiments, the post-composition rule engine 104 can make adjustments based on print job and mailing criteria, and also downstream processing information. For example of downstream processing information, the dynamic adjustment module may optimize job processing in case of downtime of available equipment or personnel. Furthermore, in various embodiments, the post-composition rule engine 104 may take into account various business rules or reason during the formation of the print job. The mailing priorities can be adjusted for each mail processing run or group of mail processing runs according to the different business rules and reasons. For example, printing and mailing priority may be given to customers who have a history of quick payment, whereas customers who delay payment may have their printing deprioritized.

Figure 3A:
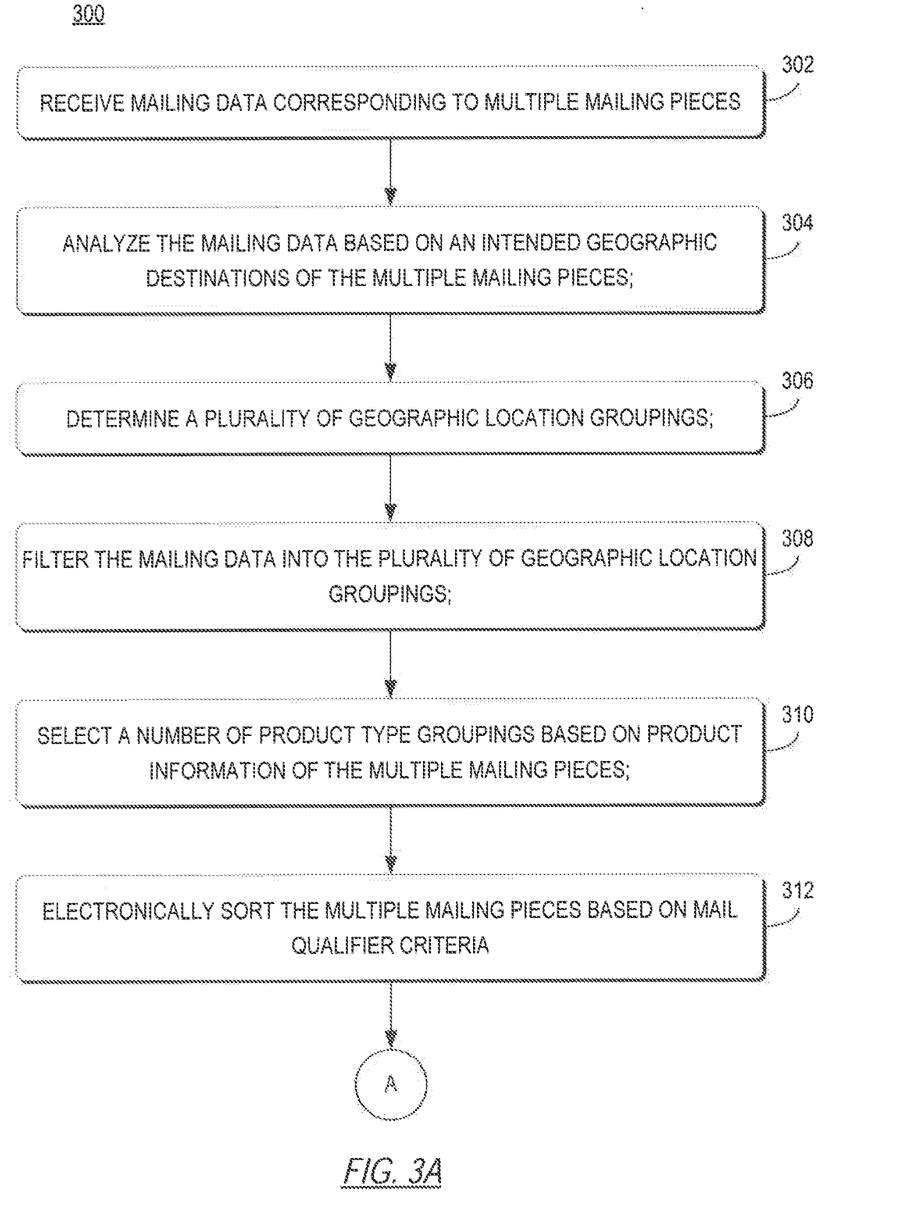
FIGS. 3A and 3B illustrate a method for processing a large volume of documents, in accordance with various embodiments.
Figure 3B:
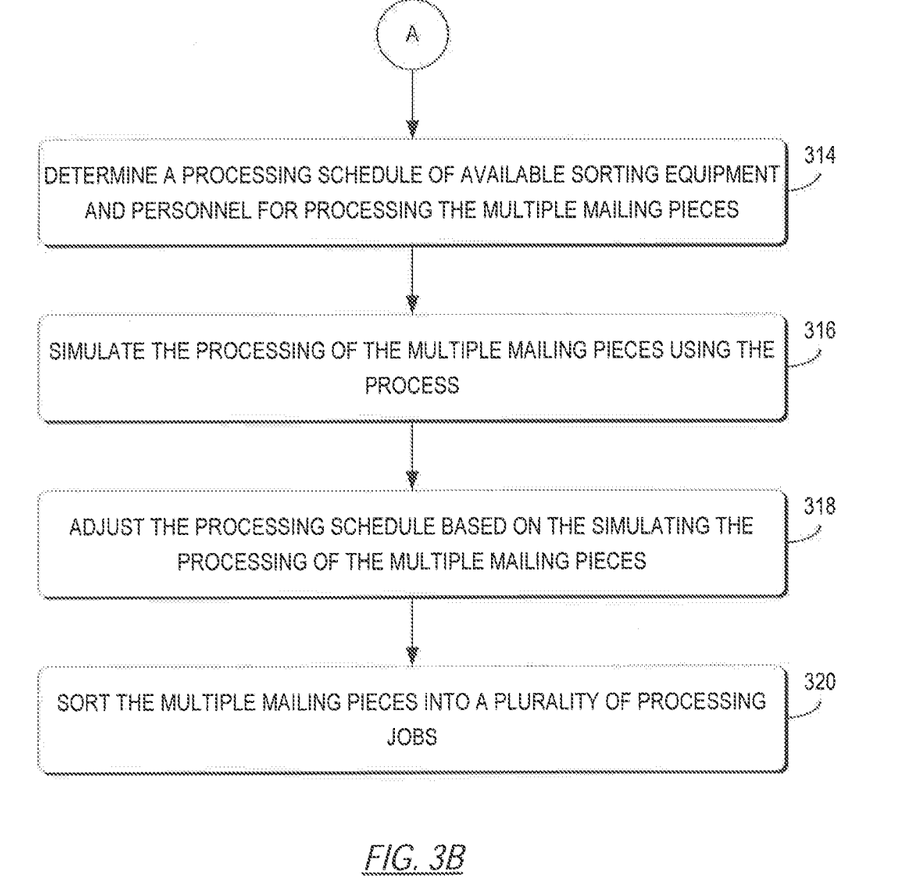

FIGS. 3A and 3B illustrate an exemplary embodiment of a method for processing a large volume of documents. In accordance with various embodiments and with reference to FIG. 3A, a method 300 for processing a large volume of documents may include receiving mailing data, by the post-composition rule engine 104, corresponding to multiple mailing pieces 302. The mailing data may include information identifying attributes of the mailing pieces, such as, but not limited to, destination address, number of pages, mailing class, product information such as product size and product type, and so forth. The mailing data may also include information to be mailed, such as, credit card statement information including, without limitation, statement date, card number, card member name, total amount due, payment due date, a listing of transactions, and so forth.

Furthermore, method 300 may include analysis, by the post-composition rule engine 104, of the mailing data based on intended geographic destinations of the multiple mailing pieces 304. The post-composition rule engine 104 may analyze the destination address associated with the mailing piece from the mailing data.

Method 300 may include determining, by the post-composition rule engine 104, a plurality of geographic location groupings 306. Examples of geographic location groupings include, without limitation, countries, territories, states, providences, zip code, region, county, and so forth.

Method 300 may include filtering, by the post-composition rule engine 104, the mailing data into the plurality of geographic location groupings 308. The mailing pieces that are not included in the geographic location groupings, are filtered into a worldwide non-presort grouping. Further, some mailing pieces may be addressed to non-deliverable geographic areas. Such mailing pieces may be removed from the processing. Such mailing pieces may be processed by a separate process, or processed manually.

Method 300 may include selecting, by the post-composition rule engine 104, a number of product type groupings based on product information of the multiple mailing pieces 310. The post-composition rule engine 104 may read the product information corresponding to the mailing pieces from the mailing data received by the receiving module 202. Product type groupings include, for example mailers, inserts, and physical products.

Method 300 may include electronically sorting, by the post-composition rule engine 104, the multiple mailing pieces based on mail qualifier criteria 312. Mail qualifier criteria include physical mailing characteristics, box size, envelope size, and so forth. The envelope size may be derived from the number of pages or type of insert in the mailing piece. The post-composition rule engine 104 may identify some mail qualifier criteria from the mailing data, and derive some mail qualifier criteria such as envelope size, from other information, such as the number of sheets, in the mailing data.

In various embodiments and with reference to FIG. 3B, method 300 may also include determining, by the post-composition rule engine 104, a processing schedule of available sorting equipment and personnel for processing the multiple mailing pieces 314. The processing schedule may list the order of processing the mailing pieces, volume of mailing pieces to be processed by each of the sorting equipment and personnel, the estimated time of completion of each sorting, and so forth.

Method 300 may include simulating, by the post-composition rule engine 104, the processing of the multiple mailing pieces using the processing schedule 316. The simulation result may indicate the idle time of each of the available equipment and personnel, the load on each of the available equipment and personnel, total estimated time of completion of the processing schedule, bottlenecks in the processing schedule and so forth.

Method 300 may include adjusting, by the post-composition rule engine 104, the processing schedule based on the simulating the processing of the multiple mailing pieces 318. The post-composition rule engine 104 may adjust the processing schedule based on the available sorting equipment and the multiple mailing pieces to be processing within a specific time period.

Method 300 may include sorting, by the post-composition rule engine 104, the multiple mailing pieces into a plurality of processing jobs 320. Each processing job of the plurality of processing jobs includes a subset of the multiple mailing pieces. The post-composition rule engine 104 may direct the plurality of processing jobs to the available sorting equipment.

In various embodiments, the post-composition rule engine 104 also determines the minimum job size threshold and maximum job size threshold for the available sorting equipment. The post-composition rule engine 104 may divide a processing job into two independent processing jobs in response to a job size of the processing job exceeding the maximum job size threshold. The post-composition rule engine 104 may divide the processing jobs such that the independent processing jobs are within the minimum and maximum job size thresholds. The post-composition rule engine 104 may also combine a processing job combined with a second processing job in the same process to form a combined processing job in response to a job size of the processing job being below the minimum job size threshold. Again, the post-composition rule engine 104 may combine the jobs such that the combined processing job is within the minimum and maximum job size thresholds.

Figure 4:
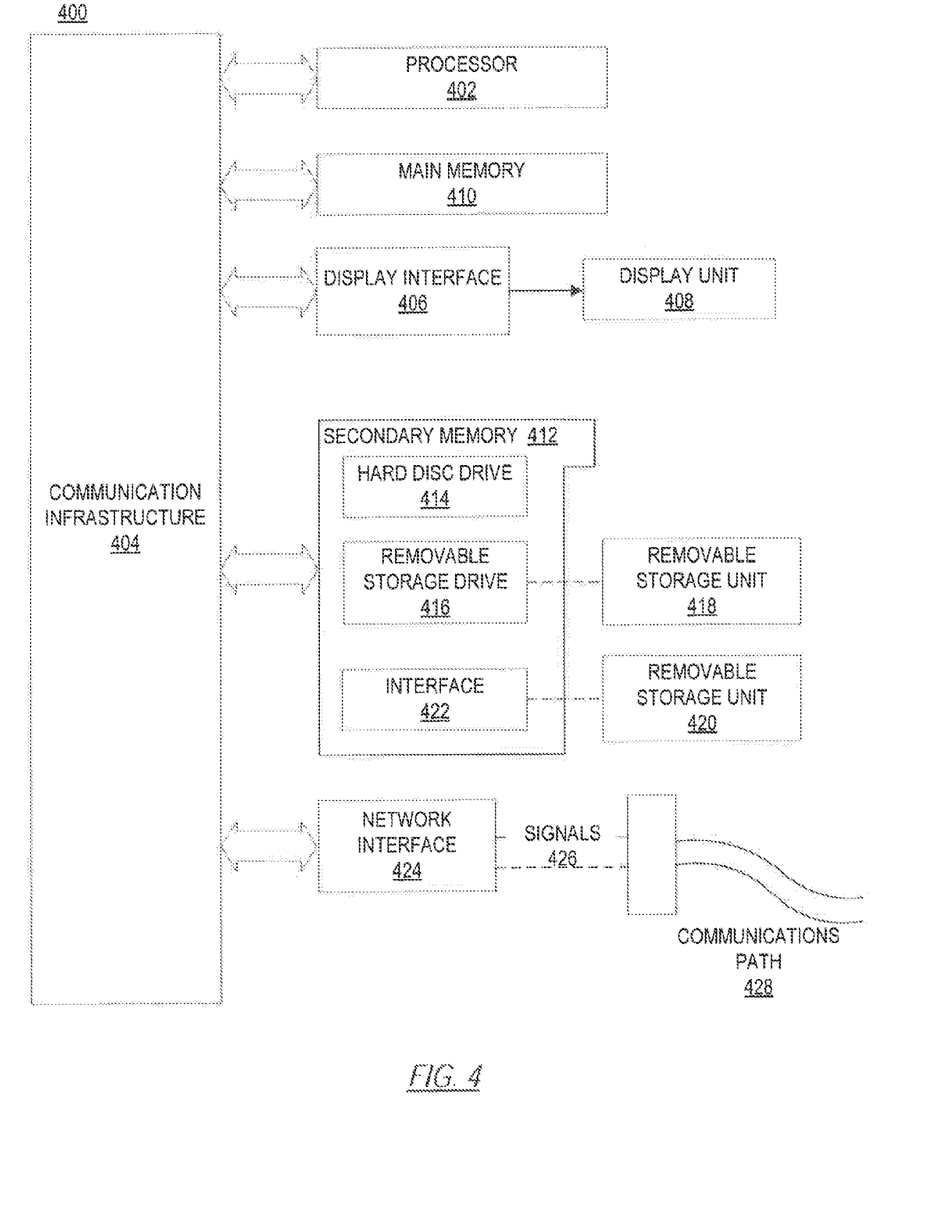
FIG. 4 illustrates a block diagram of a computer system for implementing the present disclosure, in accordance with various embodiments.

In accordance with various embodiments, the present disclosure is directed towards one or more computer systems capable of carrying out the functionality described herein. An example of the computer systems includes a computer system 400, which is shown in FIG. 4.

The computer system 400 includes at least one processor, such as a processor 402. Processor 402 is connected to a communication infrastructure 404, for example, a communications bus, a cross over bar, a network, and the like. Various software embodiments are described in terms of this exemplary computer system 400. After reading this description, it will become apparent to a person skilled in the relevant art(s) how to implement the present disclosure using other computer systems and/or architectures.

The computer system 400 includes a display interface 406 that forwards graphics, text, and other data from the communication infrastructure 404 (or from a frame buffer which is not shown in FIG. 4) for display on a display unit 408.

The computer system 400 further includes a main memory 410, such as random access memory (RAM), and may also include a secondary memory 412. The secondary memory 412 may further include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a well-known manner. The removable storage unit 418 may represent a floppy disk, magnetic tape or an optical disk, and may be read by and written on by the removable storage drive 416. As will be appreciated, the removable storage unit 418 includes a computer usable storage medium having stored therein, computer software and/or data.

In accordance with various embodiments of the present disclosure, the secondary memory 412 may include other similar devices for allowing computer programs or other instructions to be loaded into the computer system 400. Such devices may include, for example, a removable storage unit 420, and an interface 422. Examples of such devices may include a program cartridge and cartridge interface (such as that found in video game devices), a removable memory chip (such as an erasable programmable read only memory (EPROM), or programmable read only memory (PROM)) and associated socket, and other removable storage units 420 and interfaces 422, which allow software and data to be transferred from the removable storage unit 420 to the computer system 400.

The computer system 400 may further include a communication interface 424. The communication interface 424 allows software and data to be transferred between the computer system 400 and external devices. Examples of the communication interface 424 include, but may not be limited to a modem, a network interface (such as an Ethernet card), a communications port, a Personal Computer Memory Card International Association (PCMCIA) slot and card, and the like. Software and data transferred via the communication interface 424 are in the form of a plurality of signals, hereinafter referred to as signals 426, which may be electronic, electromagnetic, optical or other signals capable of being received by the communication interface 424. The signals 426 are provided to the communication interface 424 via a communication path (e.g., channel) 428. The communication path 428 carries the signals 426 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 416, a hard disk installed in hard disk drive 414, the signals 426, and the like. These computer program products provide software to the computer system 400. The present disclosure is directed to such computer program products.

Computer programs (also referred to as computer control logic) are stored in the main memory 410 and/or the secondary memory 412. Computer programs may also be received via the communication interface 404. Such computer programs, when executed, enable the computer system 400 to perform the features of the present disclosure, as discussed herein. In particular, the computer programs, when executed, enable the processor 402 to perform the features of the present disclosure. Accordingly, such computer programs represent controllers of the computer system 400.

In various embodiments, where the present disclosure is implemented using a software, the software may be stored in a computer program product and loaded into the computer system 400 using the removable storage drive 416, the hard disk drive 414 or the communication interface 424. The control logic (software), when executed by the processor 402, causes the processor 402 to perform the functions of the present disclosure as described herein.

In various embodiments, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

The various embodiments of the present disclosure have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures. Systems, methods and computer program products are provided.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTube, AppleTV, Pandora, xBox, Sony Playstation), a uniform resource locator ("URL"), a document (e.g., a Microsoft Word document, a Microsoft Excel document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones. In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer. Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

What is claimed is:

1. A method comprising:
receiving, by a computer system and over the internet, mailing data corresponding to multiple mailing pieces,
wherein the mailing data comprises information identifying attributes of the multiple mailing pieces for distribution,
analyzing, by the computer system, the mailing data based on intended geographic destinations of the multiple mailing pieces;
determining, by the computer system, a plurality of geographic location groupings;
filtering, by the computer system and using a filter module, the mailing data into the plurality of geographic location groupings,
wherein the filtering is by country, then the filtering is by zipcode;
selecting, by the computer system and using a selection module, a number of product type groupings based on product information of the multiple mailing pieces;
electronically sorting, by the computer system and using a sorting module, the mailing data based on mail qualifier criteria;
determining, by the computer system, a processing schedule of available sorting equipment and personnel for processing the mailing data to create the multiple mailing pieces,
wherein the processing schedule includes an order of processing the mailing pieces, volume of mailing pieces to be processed by each of the sorting equipment and personnel, and an estimated time of completion of each sorting;
simulating, by the computer system and using a simulation module, the processing of the multiple mailing pieces using the processing schedule;
adjusting, by the computer system, the processing schedule based on the simulating the processing of the multiple mailing pieces to create an adjusted processing schedule;
generating, by the computer system, a trigger file containing a plurality of processing jobs that identify workstations with workstation addresses,
generating, by the computer system, a print file based on the trigger file and print information from the external source,
wherein the print file contains the plurality of processing jobs,
wherein the plurality of processing jobs include an identifier of a workstation to be used to print a first mailing piece of the multiple mailing pieces, an identifier of a workstation to be used to kit the first mailing piece, an identifier of a workstation to be used to insert the first mailing piece into appropriate packaging, an identifier of a workstation to be used to pre-sort the multiple mailing pieces, data for a workstation to process the first mailing piece, and the process scheduling,
generating, by the computer system, an entry file based on the print file,
wherein the entry file includes information related to the multiple mailing pieces,
wherein the information related to the multiple mailing pieces includes a recipient of the first mailing piece, type of the first mailing piece, a payment amount for a credit card statement, and date of generating the first mailing piece;

dynamically sorting, by the computer system and during a processing job, the mailing data into the plurality of processing jobs, wherein each of the plurality of processing jobs comprises a subset of the mailing data;

removing, by the computer system and prior to printing the multiple mailing pieces, a zipcode subset of the multiple mailing pieces, wherein the subset of the multiple mailing pieces include certain zipcodes;

dynamically adjusting, by the computer system using a dynamic adjustment module and during the processing job, the product type groupings and mail qualifier criteria, based on downtime of the workstation and the personnel;

prioritizing, by the computer system and for the processing job, a quick subset of the multiple mailing pieces, wherein the quick subset includes mailing pieces associated with customers having a history of quick payment;

deprioritizing, by the computer system and for the processing job, a slow subset of multiple mailing pieces, wherein the slow subset includes mailing pieces associated with customers having a history of slow payment;

assembling, by the computer system, machine readable instructions for each of the plurality of processing jobs, the adjusted processing schedule and the print file; and transmitting, by the computer system and via a local area network, the machine readable instructions to the workstations such that the machine readable instructions control sorting devices and mailing devices, wherein the transmitting is based upon the workstation addresses and workstation destination schedules.

2. The method of claim 1, further comprising directing the plurality of processing jobs to the available sorting equipment.

3. The method of claim 2, further comprising determining the minimum job size threshold and maximum job size threshold for the sorting devices.

4. The method of claim 3, wherein the processing job is combined with a second processing job in the same process to form a combined processing job in response to a job size of the processing job being below the minimum job size threshold, wherein the combined processing job is within the minimum and maximum job size thresholds.

5. The method of claim 3, wherein the processing job is divided into two independent processing jobs in response to a job size of the processing job exceeding the maximum job size threshold, wherein each of the two independent processing jobs are within the minimum and maximum job size thresholds.

6. The method of claim 5, wherein the dynamic sorting scheme is adjustable based on the available sorting equipment and the multiple mailing pieces to be processing within a specific time period.

7. The method of claim 6, wherein the attributes of the multiple mailing pieces comprises destination address, number of pages, mailing class, product size, product type, and credit card statement information.

8. The method of claim 7, wherein the plurality of geographic location groupings are divided into at least one of countries, territories, states, providences, zip codes, and regions.

9. The method of claim 8, wherein one of the geographic location groupings includes non-deliverable areas, and wherein the multiple mailing pieces with the intended geographic destination within the non-deliverable areas are removed from the plurality of processing jobs.

10. The method of claim 9, wherein product type groupings includes mailers, inserts, and physical products.

11. The method of claim 10, wherein the mail qualifier criteria include at least one of physical mailing characteristics, box size, and envelope size.

12. The method of claim 11, wherein the envelope size is based on number of pages or type of insert in the first mailing piece.

13. The method of claim 1, further comprising:
receiving, by the computer system, encrypted print information from an external source;
decrypting, by the computer system, the encrypted print information to create print information;
further generating, by the computer system, the print file based on the trigger file and the print information from the external source,
encrypting, by the computer system, an acknowledgement (ACK) file; and
transmitting, by the computer system, the ACK file to the external source that provided the print information for the print file.

14. A post-composition rule engine comprising:
a processor,
a tangible, non-transitory memory configured to communicate with the processor,
the tangible, non-transitory memory having instructions stored thereon that, in response to execution by the processor, cause the processor to perform operations comprising:
receiving, by the processor and over the internet, mailing data corresponding to multiple mailing pieces,
wherein the mailing data comprises information identifying attributes of the multiple mailing pieces for distribution,
analyzing, by the processor, the mailing data based on intended geographic destinations of the multiple mailing pieces;
determining, by the processor, a plurality of geographic location groupings;
filtering, by the processor and using a filter module, the mailing data into the plurality of geographic location groupings,
wherein the filtering is by country, then the filtering is by zipcode;
selecting, by the processor and using a selection module, a number of product type groupings based on product information of the multiple mailing pieces;
electronically sorting, by the processor and using a sorting module, the mailing data based on mail qualifier criteria;
determining, by the processor, a processing schedule of available sorting equipment and personnel for processing the mailing data to create the multiple mailing pieces,
wherein the processing schedule includes an order of processing the mailing pieces, volume of mailing pieces to be processed by each of the sorting equipment and personnel, and an estimated time of completion of each sorting;
simulating, by the processor and using a simulation module, the processing of the multiple mailing pieces using the processing schedule;
adjusting, by the processor, the processing schedule based on the simulating the processing of the multiple mailing pieces to create an adjusted processing schedule;

generating, by the processor, a trigger file containing a plurality of processing jobs that identify workstations with workstation addresses, generating, by the processor, a print file based on the trigger file and print information from the external source, wherein the print file contains the plurality of processing jobs, wherein the plurality of processing jobs include an identifier of a workstation to be used to print a first mailing piece of the multiple mailing pieces, an identifier of a workstation to be used to kit the first mailing piece, an identifier of a workstation to be used to insert the first mailing piece into appropriate packaging, an identifier of a workstation to be used to pre-sort the multiple mailing pieces, data for a workstation to process the first mailing piece, and the process scheduling, generating, by the processor, an entry file based on the print file, wherein the entry file includes information related to the multiple mailing pieces, wherein the information related to the multiple mailing pieces includes a recipient of the first mailing piece, type of the first mailing piece, a payment amount for a credit card statement, and date of generating the first mailing piece;

dynamically sorting, by the processor and during a processing job, the mailing data into the plurality of processing jobs, wherein each of the plurality of processing jobs comprises a subset of the mailing data;

removing, by the processor and prior to printing the multiple mailing pieces, a zipcode subset of the multiple mailing pieces, wherein the subset of the multiple mailing pieces include certain zipcodes;

dynamically adjusting, by the processor using a dynamic adjustment module and during the processing job, the product type groupings and mail qualifier criteria, based on downtime of the workstation and the personnel;

prioritizing, by the processor and for the processing job, a quick subset of the multiple mailing pieces, wherein the quick subset includes mailing pieces associated with customers having a history of quick payment;

deprioritizing, by the processor and for the processing job, a slow subset of multiple mailing pieces, wherein the slow subset includes mailing pieces associated with customers having a history of slow payment;

assembling, by the processor, machine readable instructions for each of the plurality of processing jobs, the adjusted processing schedule and the print file; and transmitting, by the processor and via a local area network, the machine readable instructions to the workstations such that the machine readable instructions control sorting devices and mailing devices, wherein the transmitting is based upon the workstation addresses and workstation destination schedules.

15. The post composition rule engine of claim 14, wherein the attributes of the multiple mailing pieces comprises destination address, number of pages, mailing class, product size, product type, and credit card statement information.

16. The post composition rule engine of claim 15, wherein the plurality of geographic location groupings are divided into at least one of countries, territories, states, providences, zip codes, and regions.

17. The post composition rule engine of claim 16, wherein product type groupings includes mailers, inserts, and physical products.

18. The post composition rule engine of claim 17, wherein the mail qualifier criteria include at least one of physical mailing characteristics, box size, and envelope size, wherein the envelope size is based on number of pages or type of insert in the first mailing piece.

19. A non-transitory, tangible computer-readable storage medium having computer-executable instructions stored thereon that, if executed by a computer system, cause the computer system to perform operations comprising:

receiving, by the computer system and over the internet, mailing data corresponding to multiple mailing pieces, wherein the mailing data comprises information identifying attributes of the multiple mailing pieces for distribution, analyzing, by the computer system, the mailing data based on intended geographic destinations of the multiple mailing pieces;

determining, by the computer system, a plurality of geographic location groupings;

filtering, by the computer system and using a filter module, the mailing data into the plurality of geographic location groupings, wherein the filtering is by country, then the filtering is by zipcode;

selecting, by the computer system and using a selection module, a number of product type groupings based on product information of the multiple mailing pieces;

electronically sorting, by the computer system and using a sorting module, the mailing data based on mail qualifier criteria;

determining, by the computer system, a processing schedule of available sorting equipment and personnel for processing the mailing data to create the multiple mailing pieces, wherein the processing schedule includes an order of processing the mailing pieces, volume of mailing pieces to be processed by each of the sorting equipment and personnel, and an estimated time of completion of each sorting;

simulating, by the computer system and using a simulation module, the processing of the multiple mailing pieces using the processing schedule;

adjusting, by the computer system, the processing schedule based on the simulating the processing of the multiple mailing pieces to create an adjusted processing schedule;

generating, by the computer system, a trigger file containing a plurality of processing jobs that identify workstations with workstation addresses, generating, by the computer system, a print file based on the trigger file and print information from the external source, wherein the print file contains the plurality of processing jobs, wherein the plurality of processing jobs include an identifier of a workstation to be used to print a first mailing piece of the multiple mailing pieces, an identifier of a workstation to be used to kit the first mailing piece, an identifier of a workstation to be used to insert the first mailing piece into appropriate packaging, an identifier of a workstation to be used to pre-sort the multiple mailing pieces, data for a workstation to process the first mailing piece, and the process scheduling, generating, by the computer system, an entry file based on the print file,
   wherein the entry file includes information related to the multiple mailing pieces,
   wherein the information related to the multiple mailing pieces includes a recipient of the first mailing piece, type of the first mailing piece, a payment amount for a credit card statement, and date of generating the first mailing piece;

dynamically sorting, by the computer system and during a processing job, the mailing data into the plurality of processing jobs, wherein each of the plurality of processing jobs comprises a subset of the mailing data;

removing, by the computer system and prior to printing the multiple mailing pieces, a zipcode subset of the multiple mailing pieces, wherein the subset of the multiple mailing pieces include certain zipcodes;

dynamically adjusting, by the computer system using a dynamic adjustment module and during the processing job, the product type groupings and mail qualifier criteria, based on downtime of the workstation and the personnel;

prioritizing, by the computer system and for the processing job, a quick subset of the multiple mailing pieces, wherein the quick subset includes mailing pieces associated with customers having a history of quick payment;

deprioritizing, by the computer system and for the processing job, a slow subset of multiple mailing pieces, wherein the slow subset includes mailing pieces associated with customers having a history of slow payment;

assembling, by the computer system, machine readable instructions for each of the plurality of processing jobs, the adjusted processing schedule and the print file; and transmitting, by the computer system and via a local area network, the machine readable instructions to the workstations such that the machine readable instructions control sorting devices and mailing devices, wherein the transmitting is based upon the workstation addresses and workstation destination schedules.

* * * * *